(12) United States Patent
Wilson et al.

(10) Patent No.: US 8,355,399 B1
(45) Date of Patent: Jan. 15, 2013

(54) COMMUNICATION METHOD AND SYSTEM FOR A TRAFFIC SHAPER NETWORK

(75) Inventors: Tyler J. Wilson, Springville, IA (US); Nathan A. VanDerHorn, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 186 days.

(21) Appl. No.: 12/883,434

(22) Filed: Sep. 16, 2010

(51) Int. Cl.
*H04L 12/28* (2006.01)
*H04L 12/56* (2006.01)

(52) U.S. Cl. ........................................ 370/389; 370/392
(58) Field of Classification Search .................. None
See application file for complete search history.

(56) References Cited

U.S. PATENT DOCUMENTS

| | | | |
|---|---|---|---|
| 5,258,983 A * | 11/1993 | Lane et al. | 370/477 |
| 5,784,006 A * | 7/1998 | Hochstein | 340/905 |
| 6,181,711 B1 * | 1/2001 | Zhang et al. | 370/468 |
| 7,249,276 B2 * | 7/2007 | Meese | 714/4.1 |
| 7,327,762 B2 * | 2/2008 | Lee | 370/474 |
| 7,649,909 B1 | 1/2010 | Archard et al. | |
| 7,920,590 B2 * | 4/2011 | Le et al. | 370/467 |
| 8,040,906 B2 * | 10/2011 | Dasylva et al. | 370/401 |

* cited by examiner

*Primary Examiner* — Ayaz Sheikh
*Assistant Examiner* — Blanche Wong
(74) *Attorney, Agent, or Firm* — Donna P. Suchy; Daniel M. Barbieri

(57) ABSTRACT

A network having traffic shapers or controllers to convey packets between a sender and receiver over first and second channels of a network. A compression and decompression module associated with the sending traffic shaper or controller compresses, marks, and forwards packets to the receiver over the second channel when the packet is compressible, as determined by size reduction. A compression and decompression module associated with the receiving traffic shaper identifies marked data packets sent over the second channel and, in response thereto, decompresses and forwards the packets to the receiver.

20 Claims, 4 Drawing Sheets

COMMUNICATION METHOD AND SYSTEM FOR A TRAFFIC SHAPER NETWORK

FIELD

The present invention relates to network communications and, more specifically, to a method and system for selectively compressing and transmitting data packets in order to improve throughput in a communication network.

BACKGROUND

Network users grow increasingly dependent on distributed computing environments and wide area computer networks to accomplish critical tasks. Indeed, a wide variety of business applications are deployed across intranet, extranet and Internet connections to effect essential communications with workers, business partners and customers. As the number of users, applications and external traffic increases, however, network congestion ensues, thus impairing performance of business application. Network managers, therefore, are constantly challenged with distributing inefficiently packed data across the network in order to align network resources with business priorities and applications. Network priorities sometimes require improved data compression and other network optimization technologies to improve data flow.

Data compression and other technologies that optimize or reduce traffic volume can be deployed to improve efficiency and performance of a communication network and ease congestion at bottleneck points. For example, implementing data compression where applicable can improve network performance by reducing the amount of bandwidth required to transmit a given block of data between network devices along a communications path. Data compression can be implemented in routers without altering client or server systems, or software applications executed therein, to reduce bandwidth requirements along congested portions of a communications path. For example, tunnel communication techniques, like those used in Virtual Private Network (VPN) implementations, establish logical channels through which network traffic may be transmitted by transforming (e.g., encapsulating) data upon entering a first network device in a communications path and restored to substantially the same state upon leaving a second network device.

In view of the foregoing, it is beneficial to provide methods and systems that detect compressibility of data packets where possible and then compress the data packets for transmission across the network over a logical or physical channel.

SUMMARY

According to the present invention, there is provided a network device operable to convey packets of information between a sender and receiver. Respective network devices intercommunicate across first and second channels optionally using associated traffic shapers. A compression and decompression module associated with a sending traffic shaper compresses, marks, and forwards packets to a destination over the second channel when it is determined that the size of the data packets can be reduced by compression. A decompression module associated with the receiving traffic shaper identifies the marked data packets for decompression and forwarding to the receiver.

In another embodiment of the invention, there is provided a system that includes respective traffic controllers (e.g., traffic shapers) positioned at a source and a destination for data packets communicated across a packet data network. A source packet compressor/decompressor (PCD) associated with a source controller receives a packet from the source and determines its compressibility. In response to receiving an incompressible packet, the source controller sends an unaltered form of the packet over a first normal channel of the packet data network. Alternatively, when the traffic controller determines that the received is compressible, the PCD compresses the packet and sends it over a second channel of the packet data network. A destination PCD associated with the destination traffic controller receives the compressed packets over the second channel and decompresses the packets for forwarding to its destination.

The traffic controllers may include network controllers or traffic shapers to prioritize or otherwise control the flow of data packets across various channels of the network. PCDs comprising software modules residing in the controllers intercommunicate their presence and identification messages containing their identity and location on the network. Respective PCDs store identity and location information in respective tables in order to facilitate communication amongst themselves and across the second channel. The second channel carries data packets optionally marked with an indicia to identify their compressed state, which may comprise a separate physical channel, a logical channel residing on a common physical channel, or a tunnel, such as Generic Routing Encapsulation (GRE) Tunnel established under IP Tunneling protocol, IP Payload Compression Protocol (IPPCP) or any other suitable protocol.

In yet another embodiment of the invention, there is provided a method of providing data communication across first and second channels in a packet data network. PCDs located at respective origination and destination nodes are provided to convey compressed data packets across a second channel. The PCD located at the origination node receives a data packet and determines its compressibility. In response to detecting compressibility of the packet, the source PCD compresses the data packet for transmission across the second channel to the destination PCD. In the absence of a PCD at the destination or receiving an incompressible data packet at the source, the PCD at the origination node transmits the unmodified (e.g., uncompressed) packet across the first channel to the destination node.

Other aspects, features, and embodiments of the invention will become apparent upon review of the following description taken in connection with the accompanying drawings. The invention, though, is pointed out with particularity by the appended claims.

BRIEF DESCRIPTION OF THE DRAWINGS

For a more complete understanding of particular embodiments and their features and advantages, reference is now made to the following description, in which.

DETAILED DESCRIPTION

Figure 1:
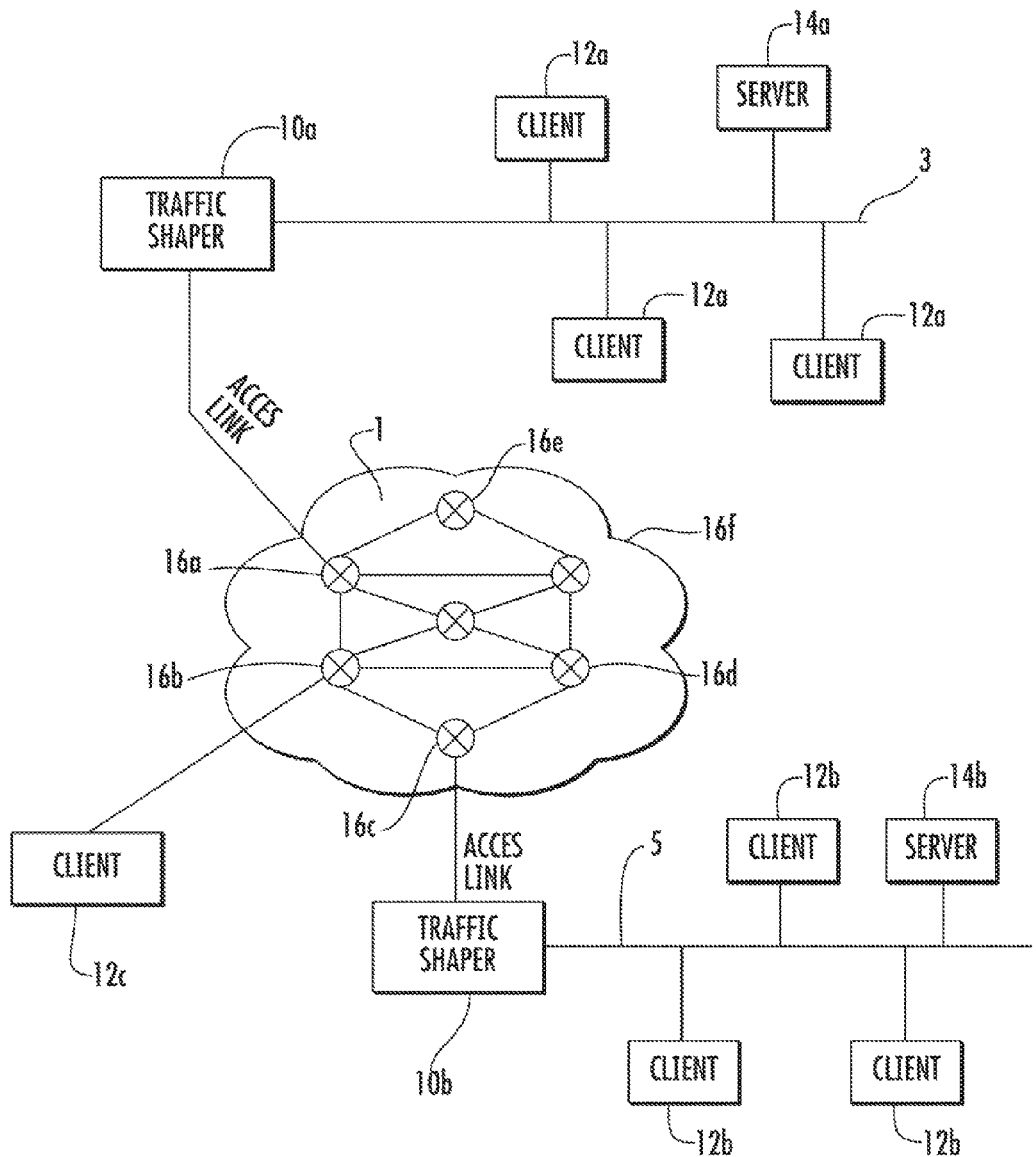
FIG. 1 is a functional block diagram illustrating a computer network architecture in which the claimed embodiments may operate.

FIG. 1 illustrates a computer network with a plurality of traffic shapers 10 for compression and decompression of packets to seamlessly and transparently convey the packets between end-users in accordance with the present invention. Local area networks (LANs) 3, 5 interconnect several TCP/IP end points, respectively. These end points include senders and receivers in the form of client devices 12a, 12b, respectively, and servers 14a, 14b, respectively, that provide access to resources of network 1. For instance network 1 can be an intranet, extranet, or Internet and connection thereto is accomplished by any suitable and conventional means. The network, including computer network 1 may comprise a packet-based communication devices employing TCP/IP protocols having a plurality of interconnected digital packet transmission stations or routing nodes 16a-16g.

A data traffic controller such as traffic shaper 10 on LANs 3, 5 is configured to selectively compress/decompress and/or mark data packets for transmission across or through established communication tunnels or channels with remote network devices. Traffic shapers 10a, 10b on LANs 3, 5, respectively, are provided between network 1 and corresponding LANs 3 and 5. Traffic shapers 10a, 10b include a compression/decompression module to identify and establish a separate communication channel with other traffic shapers 10 on the network that have compatible compression/decompression capabilities. The compression/decompression module of traffic shapers 10 also dynamically identifies routing nodes or other network devices (such as each other). Instead of implementing the compression/decompression module in a traffic shaper, other network devices or controllers may be utilized to carry out its function.

Figure 2:
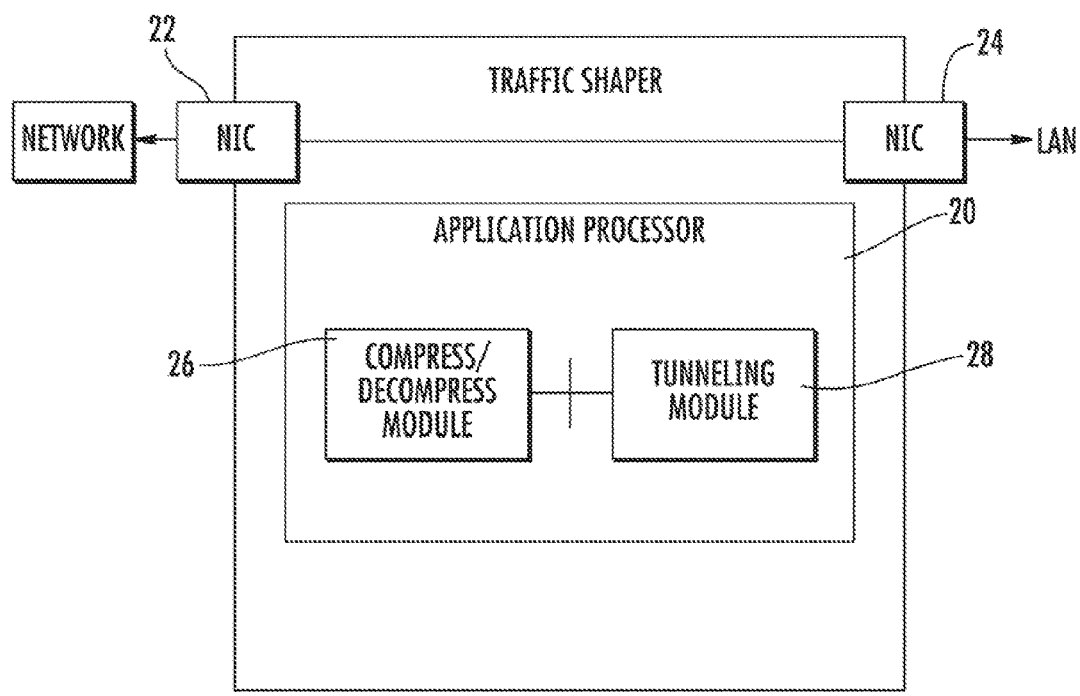
FIG. 2 is a functional block diagram illustrating the functionality of a traffic shaper, in accordance with an exemplary embodiment.

FIG. 2 illustrates, traffic shaper 10 implemented as a router and/or Ethernet bridge, and thus is transparent to client devices 12a, 12b, 12c. Traffic shaper 10, includes first and second network interfaces 22, 24, which operably connect traffic shapers 10 to the communication paths of network 1 and LANs 3, 5. Traffic shaper 10 also includes application processor 20 that implements its functionality and, includes a combination of hardware and software, such as a central processing unit, memory, a system bus, an operating system, device drivers, and one or more compression/decompression modules implementing the functions performed according to the present invention, the details of which are discussed in detail with respect to FIG. 4. Although the exemplary traffic shaper 10 is configured and illustrated as an Ethernet bridge, one skilled in the art will recognize that traffic shaper 10 can be implemented on server devices 14a, 14b, on a gateway computer (not shown), a internet server (not shown), or any other network device within the computer network environment.

Traffic shaper 10 includes a compression/decompression module 26 and a tunneling module 28. Data compression/decompression module 26 compresses and decompresses data traversing a physical or logical channel between traffic shapers 10. Tunneling module 28 creates a virtual point-to-point link between two traffic shapers 10 at respective remote points over the network 1 by establishing and maintaining a tunnel with remote traffic shapers 10 along network paths to destination devices or clients.

Compression/decompression module 26 selectively compresses and decompresses data packets in response to a compressibility determination. Module 26 may also include encryption and/or decryption functionality and may use any type of encryption/decryption including message authentication codes, digital certificates or signatures, AES, triple DES, FIPS-140, or any other encryption standard. Moreover, module 26 may include a plurality of data compression capabilities, such as compression functionality optimized for different kinds of data (e.g., text files, image files, audio files, etc.) or network application types. Data transformation or compression can be performed on just the packet data, the header data, or on the entire packet depending on the implementation. In one implementation, module 26 operates on packets individually, or collects packets and transforms them on an aggregate basis. In addition, module 26 may operate to transform data from one compression format to another compression format, such as converting image data files from one format to another. Examples of suitable compression algorithms include LZ, zip, JPEG, MPEG, MP3, and the like As one method of intercommunication between traffic shapers, tunneling module 28 provides tunneling functionality based on one or more transport and encapsulation protocols. In one embodiment, tunneling module 28 includes traffic shaper discovery software and a variety of tunneling capabilities including the ability to employ different transport and encapsulation protocols depending upon available data compression algorithms in compression module 26. Tunneling module 20 is also operative to establish paths between traffic shapers 10a, 10b using encapsulation and transport technologies, such as Generic Routing Encapsulation (GRE) protocol, IP in IP Tunneling protocol, IP Payload Compression Protocol (IPPCP) and/or any other suitable protocol.

Traffic shaper discovery software in tunneling module 28 informs peer traffic shapers 10 of its presence by transmitting discovery messages containing identity and location information for itself and all downstream subnets and interposing traffic shapers 10. This information is stored and dynamically updated in rule tables for the firewall (iptables for traffic shaper 10 running on a Linux operating system) contained in a memory, which may be located in a tunneling module 28 of corresponding traffic shapers 10. These discovery messages may be routinely or periodically transmitted by traffic shaper 10 and received by peer traffic shapers 10 on network 1, in order to provide traffic shapers 10 with updated information regarding the presence or absences of peer traffic shapers 10. For instance, if a discovery message is not received from a peer traffic shaper 10 within a specified period of time, the rule tables associated with the peer traffic shaper 10 are removed. This prevents compressed data packets from being inadvertently sent to a peer traffic shaper 10 that has been disabled or removed from the network 1.

Figure 3:
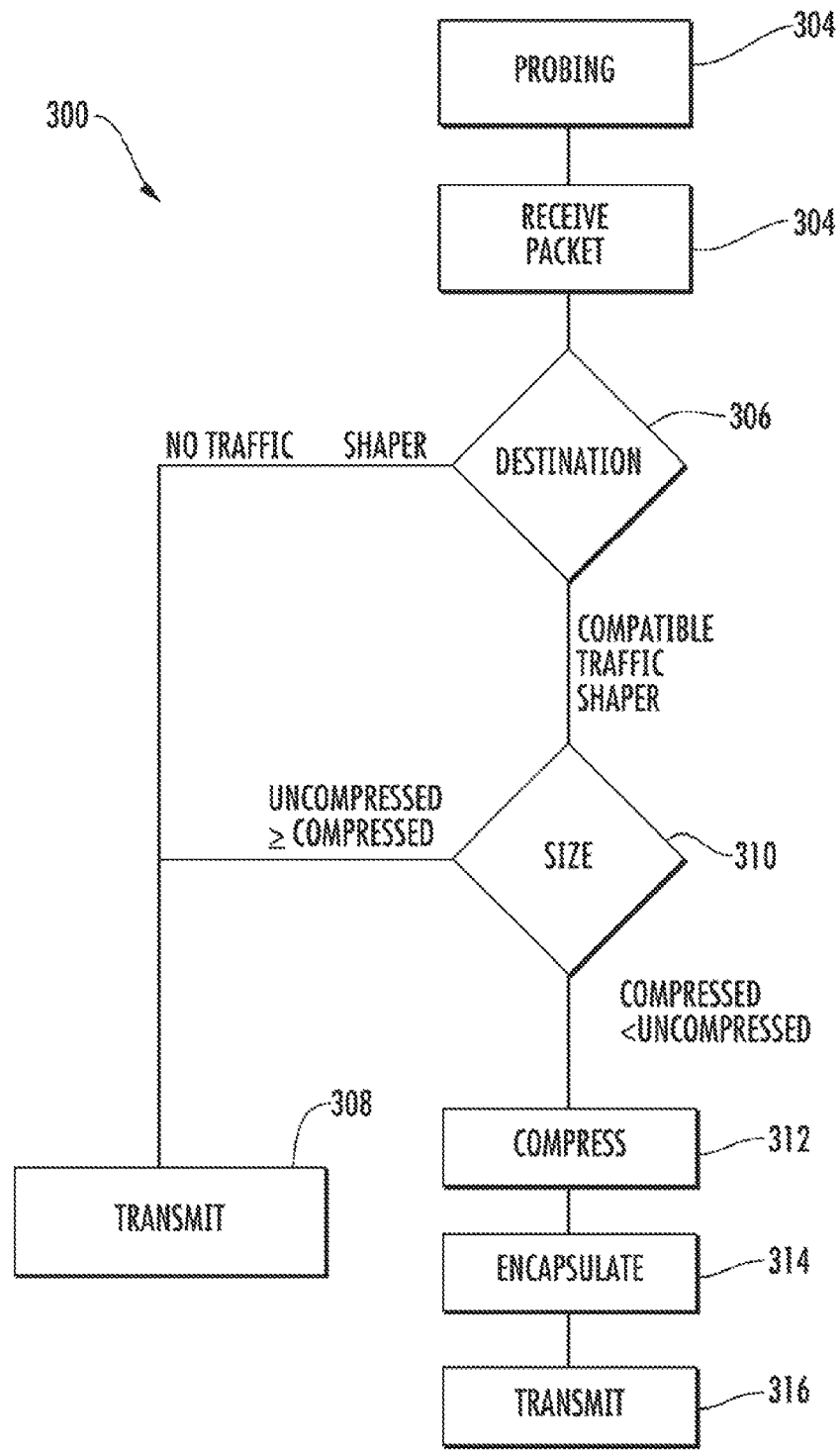
FIG. 3 is a flow chart diagram illustrating a method for processing data packets and establishing logical communication channels, in accordance with an exemplary embodiment of the present invention.

FIG. 3 is a flow chart diagram illustrating a method 300 for processing packets, in accordance with an exemplary embodiment. The method begins by traffic shaper 10 probing communication paths to detect other traffic shapers 10 that are similarly compatible to transmit and receive compressed data packets. When traffic shaper 10 receives a data packet in step 304, it determines the packet destination in step 306. If the destination of the data packet does not have a compatible traffic shaper 10 or the destination traffic shaper was not discovered in step 302, the data packet is forwarded over a primary (e.g., usual and customary data channel) to its destination without modification in step 308.

Alternatively, if traffic shaper detects or determines that the destination of the data packet has a compatible traffic shaper 10, step 310 determines whether the size of a compressed version of the data packet (while accounting for the additional IP/GRE header) is less than the unmodified (e.g., uncompressed) version of the data packet. If not, then step 308 provides for forwarding the data packet over the primary communication channel to its destination without modification. On the other hand, if the compressed version of the packet plus the additional data to account for the IP/GRE header (and/or other compression overhead) is smaller than the unmodified/uncompressed version of the data packet, then the data packet is compressed and marked by PCD module 26 in step 312 for transmission across a logical or physical secondary channel or, in an alternative embodiment, encapsulated by tunneling module 28 in step 314, and then transmitted through the GRE tunnel to its destination in step 316.

Thereafter the receiving traffic shaper 10 detects the compressed data packet sent over a secondary channel, decompresses the data packet, and forwards it to the client recipient 12b via server 14b. One skilled in the art will recognize that other algorithms (other than size determination) may be used to determine compressibility of a packet to invoke the compression/decompression module. For example, the packet may possess a data type identifier in its header that may be examined to determine compressibility. Alternatively, the packet header may be modified by the sending device to indicate compressibility.

Figure 4:
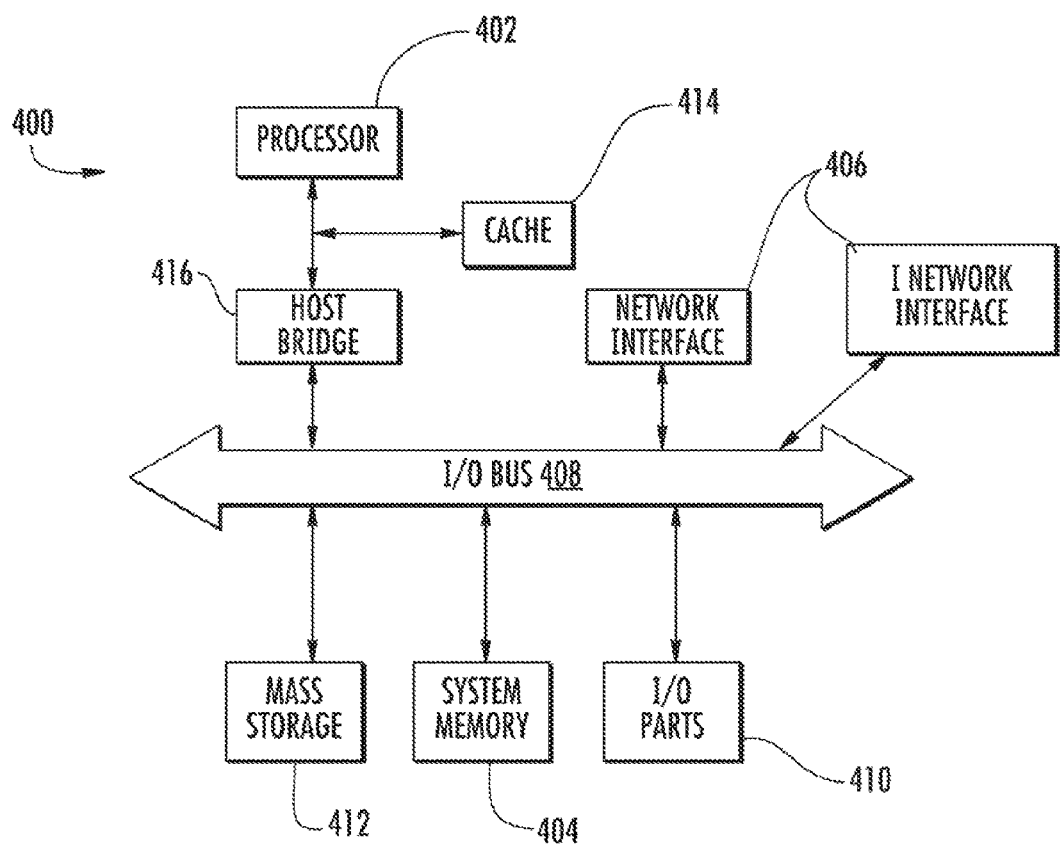
FIG. 4 is a functional block diagram illustrating hardware components of the traffic shaper of FIG. 2, in accordance with an exemplary embodiment of the present invention.

FIG. 4 shows an exemplary computing platform and hardware architecture for traffic shaper 10. In one implementation, traffic shapers 10 comprise a system 400 including a processor 402, a system memory 404, network interfaces 406 and one or more software applications and drivers enabling the functions described herein. The hardware system 400 includes a standard I/O bus 408 with I/O Ports 410 and mass storage 412 coupled thereto. Host bridge 416 couples processor 402 to I/O bus 408. The hardware system may further include video memory (not shown) and a display device coupled to the video memory. Collectively, these elements are intended to represent a broad category of computer hardware systems, including but not limited to general purpose computer systems based on the Pentium processor manufactured by Intel Corporation of Santa Clara, Calif., as well as any other suitable processor.

Elements of computer hardware system 400 perform their conventional functions known in the art. In particular, network interfaces 406 are used to provide communication between system 400 and any of a wide range of networks, such as an Ethernet (e.g., IEEE 802.3) network, etc. Mass storage 412 is used to provide permanent storage for the data and programming instructions to perform the above described functions implemented in the application processor 20 of FIG. 2, whereas system memory 404 (e.g., DRAM) is used to provide temporary storage for the data and programming instructions when executed by processor 402. I/O ports 410 are one or more serial and/or parallel communication ports used to provide communication between additional peripheral devices, which may be coupled to hardware system 400.

Hardware system 400 may include a variety of system architectures, and various components of hardware system 400 may be rearranged. For example, cache 414 may be on-chip with processor 402. Alternatively, cache 414 and processor 402 may be packed together as a "processor module," with processor 402 being referred to as the "processor core." Furthermore, certain implementations of the claimed embodiments may not require nor include all of the above components. For example, additional components may be included in system 400, such as additional processors, storage devices, or memories.

As discussed above, in one embodiment, the operations of traffic shaper 10 described herein are implemented as a series of software routines run by hardware system 400. These software routines comprise a plurality or series of instructions to be executed by a processor in a hardware system, such as in processor 402 which comprises application processor 20 of FIG. 2. Initially, the series of instructions are stored on a storage device, such as mass storage 412. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interfaces 406. The instructions are copied from the storage device, such as mass storage 412, into memory 404 and then accessed and executed by processor 402. Other implementations are possible. For example, some or all of the functionality described herein can be embodied in firmware or hardware components, such as application specific integrated circuits, and the like.

An operating system manages and controls the operation of system 400, including the input and output of data to and from software applications (not shown). The operating system provides an interface between the software applications being executed on the system and the hardware components of the system. According to one embodiment of the claimed embodiments, the operating system is the LINUX operating system. However, the claimed embodiments may be used with other conventional operating systems, such as the Windows 95/98/NT/XP operating system, available from Microsoft Corporation of Redmond, Wash. Apple Macintosh Operating System, available from Apple Computer Inc. of Cupertino, Calif., UNIX operating systems, and the like. Of course, other implementations are possible. For example, the functionality of traffic shaper 10 may be implemented by a plurality of server blades communicating over a backplane in a parallel, distributed processing architecture.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. A method of providing data communication in a packet data network that includes determining whether a size of a packet can be reduced by compression of the packet, and having respective packet compressor/decompressors (PCDs) located at an origination node and at least one destination node of a network in order to provide packet communication between a sender and a receiver, the method comprising:
   receiving the packet from the sender at a PCD of the origination node,
   determining compressibility of the received packet and, in response thereto, performing at least one of (i) sending the received packet over a first channel when the received packet is incompressible, or, (ii) compressing the received packet and sending the compressed packet over a second channel when the received packet is compressible;
   decompressing the compressed packet at a PCD at the at east one destination node when received over the second channel; and
   forwarding the decompressed packet to the receiver.

2. The method of claim 1, and further comprising determining a presence of the PCD at the at least one destination node, and in an absence of the PCD at the at least one destination node, sending the received packet to the receiver over the first channel, and in the presence of the PCD at the at least one destination node performing the determining step.

3. The method of claim 1, wherein the PCDs of the origination and the at least one destination nodes intercommunicate a presence of at least one downstream PCD having a capacity to compress and decompress packets.

4. The method of claim 1, wherein the PCD is a module residing in an operating system of a traffic shaper.

5. The method of claim 3, wherein the PCD is a module residing in a traffic shaper, wherein the traffic shaper controls a flow of data communication in the packet data network.

6. The method of claim 1, wherein the first and second channels comprise logical channels carried on a common physical channel.

7. The method of claim 1, wherein the second channel comprises a logical channel including a transport and encapsulation protocol selected from the group consisting of GRE tunnel, IP in IP Tunneling, and IPPCP.

8. The method of claim 7, further comprising encapsulating the compressed packet for conveyance over the GRE tunnel in response to determining the compressibility of the received packet.

9. The method of claim 1 wherein the determining step is based on whether a size of the received packet can be reduced with compression.

10. A system to provide communication between a source and a destination for a packet in a packet data network, the system comprising:
    a traffic controller located at each of the source and the destination;
    a source packet compressor/decompressor (PCD) associated with the source traffic controller to receive the packet from the source, to determine compressibility of the packet, to at least one of send the packet over a first channel to the destination traffic controller when the packet is incompressible, or, to compress the packet and send the compressed packet over a second channel when the packet is compressible; and
    a destination PCD associated with the destination traffic controller to receive the compressed packet over the second channel; to decompress the compressed packet; and to forward the decompressed packet to the destination.

11. The system of claim 10, wherein the traffic controllers located at the source and the destination comprise traffic shapers.

12. The system of claim 11, wherein the second channel comprises a GRE tunnel.

13. The system of claim 11, wherein the source and the destination traffic shapers intercommunicate messages in order to update tables in each of the source and the destination that indicate a presence of PCDs at the respective source and destination.

14. The system of claim 13, wherein the source and the destination traffic shapers intercommunicate messages in order to update respective tables therein that indicate the presence of at least one PCD.

15. The system of claim 10, wherein the source traffic controller marks compressed packets with an annotation and the destination PCD decompresses the packets in response to the annotation.

16. The system of claim 10, wherein the first and second channels comprise logical channels residing on a common physical channel.

17. The system of claim 10, wherein the PCDs in each of the source and the destination comprise software modules residing within respective traffic controllers at the source and the destination of the packet data network.

18. A network device operable to convey packets of information between a sender and receiver, the network device comprising:
    a communication link with first and second communication channels between the sender and the receiver;
    a traffic shaper associated with the sender to send the packets over the first and the second communication channels;
    a compression module operative to compress the packets and mark and forward a compressed packet to the receiver over the second channel according to a determination of a packet size reduction when attempting to compress the packet; and to otherwise send a packet to the receiver over the first channel when the packet is determined to be incompressible.

19. The network communication device of claim 18, wherein the compression module is included within the traffic shaper at the sender.

20. The network communication device of claim 18, wherein the first and second channel comprise logical channels on a common physical channel.

* * * * *